Nov. 28, 1950            E. J. ZEITLIN            2,531,593
TEMPERATURE CONTROL SYSTEM FOR HEATING UNITS
Filed May 22, 1946            2 Sheets-Sheet 1
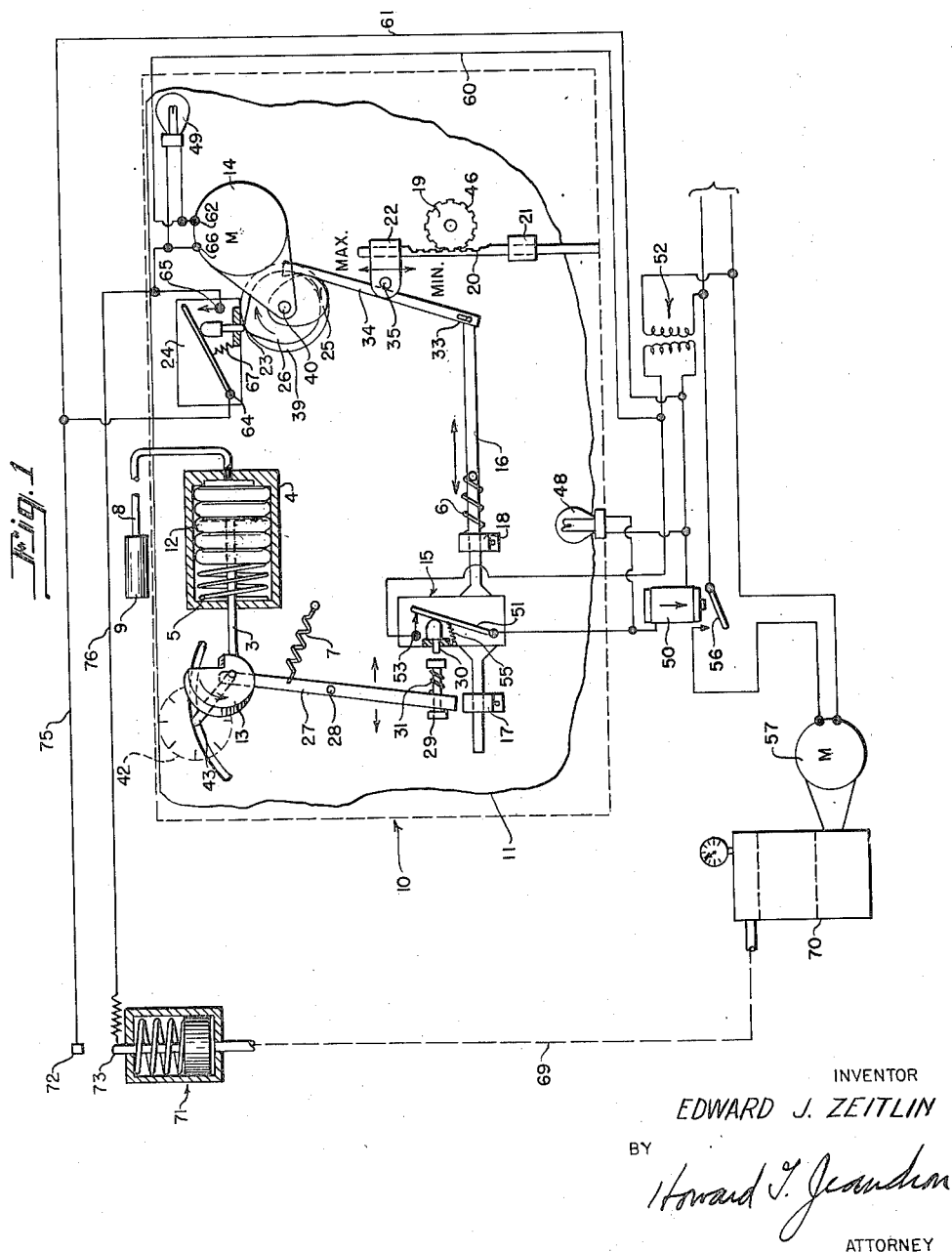
INVENTOR
EDWARD J. ZEITLIN
BY
Howard J. Jeandron
ATTORNEY Nov. 28, 1950 E. J. ZEITLIN 2,531,593
TEMPERATURE CONTROL SYSTEM FOR HEATING UNITS
Filed May 22, 1946 2 Sheets-Sheet 2
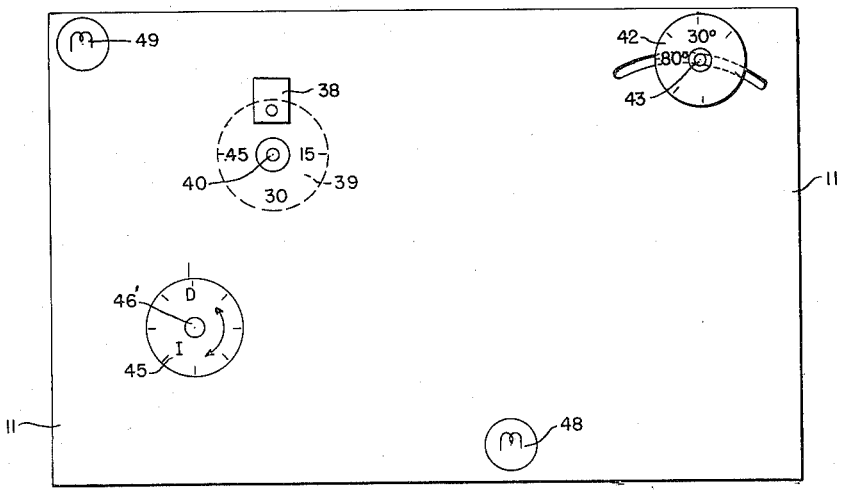
INVENTOR
EDWARD J. ZEITLIN
BY
ATTORNEY Patented Nov. 28, 1950

2,531,593

UNITED STATES PATENT OFFICE 2,531,593

TEMPERATURE CONTROL SYSTEM FOR HEATING UNITS

Edward J. Zeitlin, Brooklyn, N. Y.

Application May 22, 1946, Serial No. 671,542

8 Claims. (Cl. 236—91)

This invention relates to certain new and useful improvements in a heating control system, and more particularly to a system for controlling the time interval that the burner shall be operating and in which the time interval of operation for each hour may be predetermined but, in addition, means may be provided to change said time interval, said means being controlled by the outside temperature.

In the past, most heating control systems have been regulated by a clock mechanism, providing a setting to permit the burner or heating unit to be operated for a definite interval of time during each hour of the clock operation. Such systems have been provided with adjustable means to change the number of minutes of operation for each hour. Many of these systems have been provided with an inside thermostat so that the interval of time that may have been set in the control apparatus may be changed upon the demand for more heat, or such circuit may be broken by the inside thermostat indicating a predetermined temperature having been attained. In most of the known systems it has been necessary to actually attain a given temperature, as indicated on the thermostat, before a correction would be introduced into the controlling system, thus in many instances the system provides a greater degree of heat than is actually necessary before the response may be obtained and the correction introduced into the system.

An object of this invention is to provide a controlling unit to predetermine the time of interval of operation of a heating unit, with means to modify that interval of operation depending upon the outside temperature.

A further object of this invention is to provide a time interval controlling unit for a heating system that is inoperative until a predetermined drop in outside temperature causes the system to be energized and in which the steam pressure produced by the system is the means of starting a timing motor providing for a timed cycle of operation of the heating unit.

A further object of this invention is to provide a time interval controlling unit for the operation of a heating system in which there is included a modifying means activated by the outside temperature and in addition the temperature may be predetermined at which the modifying means will be actuated.

A still further object of this invention is to provide a time interval controlling unit for the operation of a heating system, in which the timing motor is not energized until a predetermined outside temperature has been reached to demand heat from the system, thus, when heat is demanded the timing motor will be energized for a predetermined timed cycle of operation.

A further object of this invention is to provide means to energize the timing motor for a predetermined timed cycle of operation, and in which the timing motor will start operating when a predetermined minimum outside temperature has been reached and will continue to operate for a plurality of timed cycles of operation as long as the outside temperature remains below a predetermined setting for the system, but in which the timing motor shall be de-energized when the outside temperature is equal to the predetermined setting and consequently the heating unit does not provide the means to energize the timing motor.

A still further object of this invention is to provide a timed interval controlling unit for the operation of a heating system in which the timing motor is provided with an indicating element to indicate its actual elapsed time of operation and in which the circuit to the heating burner is provided with an "on" indicating element to indicate either the "on" or "off" period of operation.

A still further object of this invention is to provide a timed cycle controlling unit for the operation of a heating system in which the timing motor is off until the heating system provides means to energize the timing motor and start its cycle of operation, and in which an indicating element will designate the actual elapsed time that the timing motor has operated during its cycle of operation.

Further objects of this invention will be apparent by reference to the accompanying description and the drawings in which:

Fig. 1 illustrates schematically the component parts of the system and their interconnection with each other, and Fig. 2 indicates the control panel and the various indicating and setting means.

Referring to Fig. 1, there is illustrated a timed interval controlling unit 10, as indicated within the dotted lines. This unit is comprised of a supporting panel 11 on which there is mounted a bellows 12, a cam 13, a timing motor 14, a switch 15 supported by a reciprocally mounted rod 16, which is mounted in two bearings 17 and 18, a rack pinion 19 and a rack 20. Said bellows 12 is, in turn, connected to an outside temperature responsive bulb 9 by a tube 8. Said rack 20 is mounted in a supporting bearing 21 and has a pivot 22 mounted thereto. A switch 24 is also mounted to the panel 11, adjacent to the timing motor 14. A cam 25 is mounted adjacent to the timing motor 14 and driven by the timing motor in a clockwise direction. Said timing cam 25 is connected to a disc 26 provided with a single projection or cam means 23 that normally is in contact with the switch 24 to hold it in an open position. The cam 13 is rotatably mounted to a crank lever 27 and the lever is in turn pivotally affixed to the panel 11 by supporting pin 28. The lever 27 at its opposite end is provided with an actuating rod 29 that is positioned in alignment with a button 30 of the switch 15. The rod 29, mounted in the lever 27, is provided with a spring 31 to permit an over riding movement of the lever 27 after the rod 29 has operated the switch 15, thus permitting unhampered movement of the rod 27. The rod 16 already described is provided with a spring 6 that is attached to the rod at one end and bears against the support 18 at its opposite end. This spring normally biases the rod 16 toward the right (Fig. 1). The rod 16 is connected at one end thereof by means of a pin 33 to a lever 34, while its opposite end supports the switch 15. One end of the lever 34 bears against the cam 25, while the center of lever 34 is pivotally supported by a pivot 35 which is, in turn, supported by the member 22 of the rack 20. The bellows 12 are supported in a housing 4 and provides a cam rod 3 that bears against the cam 13. The bellows are normally held in a compressed relationship by a spring 5 mounted within the housing 4, but expansion of the fluid from element 9 through tube 8 will expand the bellows to the position indicated in Fig. 1 against the resilient member 5, and in turn move rod 3 and cam 13 outwardly.

The control panel described and its component parts are connected on the opposite side thereof, referring to Fig. 2, so that, for instance, a window 38 is provided in order that a disc 39 may be viewed therethrough. The disc 39 is connected by means of a shaft 40 to the cam 25 and rotates with the cam 25 (one revolution in 60 minutes), the disc 39 being divided into 60 separate calibrations will, through the window 38, show the number of divisions or minutes of operation of the motor 14. Further illustrated on the panel 11 of Fig. 2 is a dial 42 mounted on a shaft 43 that is, in turn, connected to the cam 13 of Fig. 1. It is to be noted that shaft 43 passes through a slot in panel 11 to thus permit shaft 43 to move freely with the pivotal movement of cam 13 mounted on the lever 27. The dial 42 is divided into a number of indicia in which a chosen range of temperatures have been indicated and the movement of the dial from the minimum to the maximum indicated temperature shall be the same degree of movement of the cam 13 from its minimum radius to its maximum radius. Further illustrated in Fig. 2 of the panel 11, is a dial 45 indicating increased or decreased intervals of time when heat is supplied. The dial 45 is connected to the pinion 19 of Fig. 1 by means of a shaft 46'. Movement of the dial 45 clockwise will move the rack 20 of Fig. 1 toward its minimum setting and consequently move the pivot 35 to reduce the effective degree of movement of the switch 15 by the rotative action of the cam 25. Likewise, turning the dial counterclockwise will, in the same manner, produce a greater effective degree of movement of the switch 15 by the rotative action of the cam 25. Further illustrated on the panel 11 are a pair of indicating lamps 48—49 and their function and hookup may be followed by reference to Fig. 1. Lamp 48 is shunted across the potential supplied to an operating relay 50 so that when the relay is energized the lamp 48 will be illuminated and when it is de-energized the lamp 48 will indicate the opening of switch 56 and stopping of the motor 57. The relay 50 is connected to a contact 51 of the switch 15 and the other lead to the power source (in this case a transformer 52) the other terminal of the power source is connected to a contact 53 of the switch 15. The switch 15 is normally held closed by a spring 55 and while closed will cause the relay 50 to be energized and the lamp 48 to be on. When the relay 50 is energized a main burner motor switch 56 will be maintained closed and a burner motor 57 will be operated, through its source of potential (not shown). It naturally follows that when the switch 15 is opened the circuit is broken and the relay 50 is deenergized and the lamp 48 extinguished. The lamp 49 is shunted across the leads of the timer motor 14 and will be on whenever the motor 14 is operated. The circuit to the motor 14 may be followed in which a pair of leads 60, 61 are connected to the source of potential (the transformer 52), the lead 60 being connected to one terminal of the motor 14. The other lead 61 is connected to a contact 64 of the switch 24. An opposite contact 65 of the switch 24 is, in turn, connected to the other terminal 66 of the motor 14. The switch 24 is normally held closed by a spring 67 and with the switch 24 closed the motor 14 will operate and the indicating lamp 49 will be illuminated. When the burner motor 57 operates the burner will supply heat to a furnace 70 that is, in turn, supplying heat to a system (not shown). A pressure switch 71 is connected by a tube 69 to the boiler of the furnace 70 and its contacts 72, 73 are normally held open. These contacts are connected by lines 75, 76 to the timer motor operating circuit, line 75 being connected to line 61, while line 76 is connected to terminal 66 of the motor 14. Thus steam pressure from the boiler of the furnace 70 will, through tube 69, close the pressure switch 71 and complete a circuit from the one terminal of the transformer 52, through line 61, line 75, contacts 72, 73, line 76 to terminal 66 of motor 14, while terminal 62 is connected through line 60 to the other terminal of the transformer 52. When the motor 14 is operated, the cam 25 will be driven in a clockwise direction by the motor. Likewise, the disc 26 mounted on a shaft 40 will move in unison, the disc 26 having a projection 23 that is normally holding the switch 24 open, will move with the rotation of the disc 26 and thus allow the switch 24 to close to hold the motor (14) circuit closed for a complete cycle of operation of the disc 26 and cam 25. When the projection 23 again opens the switch 24 the motor 14 will stop, unless the pressure switch 71 is maintained closed by means of the heating unit whereupon the switch 24 will again be closed and another cycle of operation of disc 26 will continue and so on until the circuit of motor 14 is finally opened by the switch 24 with the contacts 72, 73 already open.

It is apparent that the device will remain inoperative when the outside temperature exceeds the setting of dial 42, and likewise will be operated when the outside temperature equals or falls below the temperature setting of dial 42. The switch 15 is normally closed when the element 9 is recording a temperature lower than the setting of dial 42 and in such position the system is operative. However, switch 15 will be open or closed depending upon the expansion and contraction of the fluid in the bellows 12. When the outside temperature is higher than the setting of dial 42, the fluid in bulb 9 will expand and through tube 8 will expand the bellows 12. Thus, the operative end of the bellows 12 will force rod 3 against the cam 13 moving the lever 27 about the pivot point 28 and forcing the actuating rod 29 against the button 30 of the switch 15, thus, lifting the contact 51 from the contact 53. In this position the relay 59 will be de-energized and the indicating light 48 will be extinguished thus indicating that the burner motor 57 is not operating. However, when there is a drop in outside temperature the fluid in the bulb 9 will contract or rather the volatile fluid will condense and the pressure in the bellows 12 will decrease, thus allowing the pivotal lever 27 to be moved toward the bellows due to the spring 7 which maintains the lever 27 slightly biased in this direction, that is to say, it maintains the cam 13 in contact with the rod 3 which is the operative portion of the bellows 12. At the same time the lever 27 will move the actuating rod 29 away from the button 30 allowing the switch contact 51 to close, due to the spring 55 which normally maintains the switch 15 closed. Contact 51 will connect with contact 53 and the relay 59 will be energized and the lamp 48 will be illuminated to indicate the burner motor 57 is operating. Thus, it is apparent that the dial 42 may be set in its range of indicia to preselect a position of the cam 13, thus, a desired response of the heating system can be set according to a predetermined outside temperature. When the burner motor is operated the boiler 70 connected to the heating system (not shown) will provide a steam pressure and the steam pressure is utilized passing through tube 69 to actuate a pressure switch 71. The pressure will close this switch across the contacts 72, 73 which in turn, closes a circuit, as already described, to the timing motor 14. The timing motor, as already described, is connected to a cam 25 and the cycle of operation may be a sixty minute cycle. When the cam 25 moves, the disc 26 will allow the switch 24 to be closed (as described) and the motor 14 is then directly connected through switch 24 to the source of power and will operate until the disc 26 again breaks this circuit. The cam 25 is designed with a minimum and a maximum radius and in operation it co-acts with the lever 34 (as already described) so that the lever 34, which is pivotally supported at 35, will respond with its movements through the connecting pin 33 to move the rod 16, as indicated by the arrow. That is, the rod 16 is also assisted in its return movement by the spring 6 that is affixed to the rod 16 so that the lever 34 will always bear against the cam 25. The movement of rod 16 necessarily moves the switch 15 with it since it is supported thereon. Thus, presuming the lever 27 remains in a set position, as indicated in Fig. 1, the rotation of cam 25, especially as it approaches its maximum radius will cause the lever 34 to move the rod 16 sufficiently to bring switch 15 in contact with the rod 29, which, through the button 30, opens the contacts 51, 53. Thus, in this position the burner will cease to operate. However, when the cam 25 is in its minimum radius position the spring 6, affixed to the rod 16, will move rod 16 in the opposite direction so that lever 34 will bear against the minimum radius of cam 25 and the switch 15 will be moved away from the actuating rod 29 and, therefore, the button 30 will allow the contacts 51, 53 to be closed and the burner motor will be operated. Of course, the shape of the cam 25 will regulate the on and off period through switch 15, except as modified by the lever 27. It is also apparent that the expansion and contraction of the bellows 12 will cause cam 13 and lever 27 to be moved. The lever 27 will thus move rod 29 in the same relationship and thus change the predetermined timed interval that the timing cam 25 would normally hold switch 15 in its on and off relationship. It is apparent, referring to Fig. 2, that various modifications may be introduced into this system. The disc 42, as already described, provides for a temperature setting at which the system is to be modified by the outside temperature. Likewise, the disc 45 permits the movement of the pivotal point 35 to increase or decrease the interval of time at which the burner motor is to be on or off. This adjustment provides a considerable range of change without modifying the cam 25. As indicated in Fig. 1, the movement of disc 45 will move the pivotal point 35 up or down and thus change the interval of time to a greater degree or lesser degree. The indicating window 38, in Fig. 2, provides an indication of the number of minutes that the timing motor 14 has operated in any one cycle and permits predetermining the number of minutes remaining in that cycle. Also in Fig. 2, are the two indicating lights 48 and 49 permitting an indication of when the burner motor is on as well as the light 49 indicating when the timer motor is on.

Although we have indicated a pressure switch 71 in Fig. 1, this is merely one means of closing our timer circuit when the heating system happens to be a steam system, however, other means might be used similarly, such as a thermostat or other temperature responsive element. The timing motor may also be varied in its speed of operation to accomplish a longer or shorter heating cycle.

Various changes and modifications may be made in the system as illustrated and described, without departing from the spirit of this invention and this invention shall be limited only by the appended claims.

What is claimed is:

1. In a heating control system having a heating element to start the operation of a timing control unit, a burner motor and heating boiler, a pressure switch connected to said boiler to be closed by a predetermined steam pressure and opened by a lack of pressure, a timing motor and cam, said timing motor having a predetermined cycle of operation, a timing motor switch to insure the operation of said timing motor for a complete cycle, a relay to control the operation of said burner motor in the boiler, a normally closed relay switch to control the operation of said relay, an outside weather element that is responsive to changes in temperature, an expandable bellows operated by the temperature responsive weather element, a first control arm that is responsive to the movements of said bellows and provides means connected to said relay switch to open or close same depending upon the movement of said bellows, a second control arm responsive to the movements of said timing motor operated cam, means connected to said second control arm to move said relay control switch with relation to the position of said first control arm to open or close said switch.

2. In a heating control system including a steam boiler and burner motor, a pressure responsive switch connected to said steam boiler and also connected to a timing control unit to start the operation of said burner motor, the timing unit including a timing motor and cam, said timing motor having a predetermined timed cycle of operation, a timing motor switch to insure the operation of said timing motor for a complete cycle, a relay to control the operation of said burner motor in said boiler, a normally closed relay switch to control the energization of said relay, an outside weather element that is responsive to changes in temperature, an expandable bellows operated by the temperature responsive weather element, a first control arm that is responsive to the movements of said bellows and provides means connected to said relay switch to open or close said switch, a second control arm responsive to the movements of said timing motor operated cam, means connected to said second control arm to move said relay control switch with relation to the position of said first control arm to open or close said switch.

3. In a heating system including a boiler and burner motor, a pressure responsive switch that is closed by a predetermined pressure of the steam in said boiler and opens by a lack of pressure, a timing motor and cam, said timing motor having a predetermined timed cycle of operation, a timing motor switch to insure the operation of said timing motor for a complete cycle, a relay to control the operation of said burner motor for the boiler, a normally closed relay switch to control the energization of said relay, an outside weather element that is responsive to changes in temperature, an expandable bellows operated by the temperature responsive weather element, a first control arm that is responsive to the movements of said bellows and provides means connected to said relay switch to open or close same depending upon the movement of said bellows, a second control arm responsive to the movements of said timing motor operated cam, means connected to said second control arm to move said relay control switch with relation to the position of said first control arm to open or close said switch.

4. In a heating control sysem including a timing unit, a heating boiler, burner and motor, a steam pressure element connected to said boiler to start the operation of said timing control unit and to determine which cycle of the timing unit shall be the last, the timing control unit including a timing motor and cam, said timing motor having a predetermined cycle of operation, a timing motor switch to insure the operation of said timing motor for a complete cycle, a relay to control the operation of said burner motor for the heating boiler, an indicating element that is energized by the burner motor circuit, a normally closed relay switch to control the energization of said relay, an outside weather element that is responsive to changes in temperature, an expandable bellows operated by the temperature responsive weather element, a first control arm that is responsive to the movements of said bellows and provides means connected to said relay switch to open or close said switch, a second control arm responsive to the movements of said timing motor operated cam, means connected to said second control arm to move said relay control switch with relation to the position of said first control arm to open or close said switch.

5. In a heating control system including a timing unit, a heating boiler, burner and motor, a steam pressure switch connected to said boiler to start the operation of said timing control unit and to determine which cycle of said timing unit shall be the last, the timing control unit including a timing motor and cam, a timing motor switch to insure the operation of said timing motor for a complete cycle, an indicating element that is energized by the closing of the timing motor circuit, a relay to control the operation of said burner motor for the heating boiler, a normally closed relay switch to control the energization of said relay, an outside weather element that is responsive to changes in temperature, an expandable bellows operated by the temperature responsive weather element, a first control arm that is responsive to the movements of said bellows and provides means connected to said relay switch to open or close same depending upon the movement of the bellows, a second control arm responsive to the movements of said timing motor operated cam, means connected to said second control arm to move said relay control switch with relation to the position of said first control arm to open or close said switch.

6. In a heating control system including a timing unit, a heating boiler, burner and motor, a pressure switch connected to said boiler and said switch connected to said timing unit, said timing unit including a timing motor and cam, a calibrated disc driven in unison with said timing motor cam, a normally closed timing motor switch to control the operation of said timing motor, a relay to control the operation of said burner motor in the heating boiler, a normally closed relay switch to control the energization of said relay, an outside weather element that is responsive to changes in temperature, an expandable bellows operated by the temperature responsive weather element, a first control arm that is responsive to the movements of said bellows and provides means connected to said relay switch to open or close same depending upon the movement of the bellows, a second control arm responsive to the movements of said timing motor operated cam, means connected to said second control arm to move said relay control switch with relation to the first control arm, and means to indicate the positoin of said timing motor cam.

7. In a heating control system including a timing unit, a heating boiler, burner and motor, a switch interconnected between said boiler and said timing unit to start said unit and to determine which cycle shall be the last, said timing unit including a timing motor and cam, said timing motor having a predetermined timed cycle of operation, a normally closed timing motor switch to insure the operation of said timing motor for a complete cycle, a relay to control the operation of said burner motor in the heating boiler, a normally closed relay switch to control the energization of said relay, an element that is responsive to changes in temperature, an expandable bellows operated by the temperature responsive element, a first control arm that is responsive to the movements of said bellows and provides means connected to said relay switch to open or close same with the action of said bellows, a second control arm responsive to the movements of said timing motor operated cam, a pinion and rack with a pivot support mounted on said rack, said pivot support mounted in juxtaposition to said second control arm, said rack determining the position of said pivot and the pivotal movement of said arm, means connected to said second control arm to move said relay control switch with relation to the first control arm, and means to change the effective movement of said second control arm and, in turn, the relationship of the relay switch to the first control arm which in turn changes the on and off period of said heating boiler burner.

8. In a heating control system including a timing unit, a heating boiler, burner and motor, a switch interconnected between said boiler and said timing unit to start said unit and to determine which cycle shall be the last, said timing unit including a timing motor and cam, said timing motor having a set timed cycle of operation, a normally closed switch to insure the operation of said timing motor for a complete cycle, a relay to control the operation of said burner motor, a normally closed relay switch to control the energization of said relay, a weather element that is responsive to changes in temperature, a bellows connected to the weather element and movable by same, a first control arm that is responsive to the movement of said bellows and provides means connected to said relay switch to open or close same depending upon the movement of said bellows, an adjustable cam mounted on the end of said first control arm in contact with a cam rod of said bellows to determine a temperature to which said arm will respond, a second control arm responsive to the movements of said timing motor operated cam, means connected to said second control arm to move said relay control switch with relation to the first control arm.

EDWARD J. ZEITLIN.

REFERENCES CITED

The following references are of record in the file of this patent:

UNITED STATES PATENTS

| Number | Name | Date |
|---|---|---|
| 1,604,342 | Greenhut | Oct. 26, 1926 |
| 1,715,987 | Brown | June 4, 1929 |
| 1,786,083 | Penn | Dec. 23, 1930 |
| 1,869,161 | Merrill | July 26, 1932 |
| 1,929,182 | Webb | Oct. 3, 1933 |
| 2,141,206 | Cunningham | Dec. 27, 1938 |
| 2,251,483 | Denison et al. | Aug. 5, 1941 |
| 2,275,427 | Greenlee | Mar. 10, 1942 |